May 3, 1927.  
C. BETHEL  
1,626,662
TRUCK MOTOR FRAME SUSPENSION
Filed Sept. 8, 1923
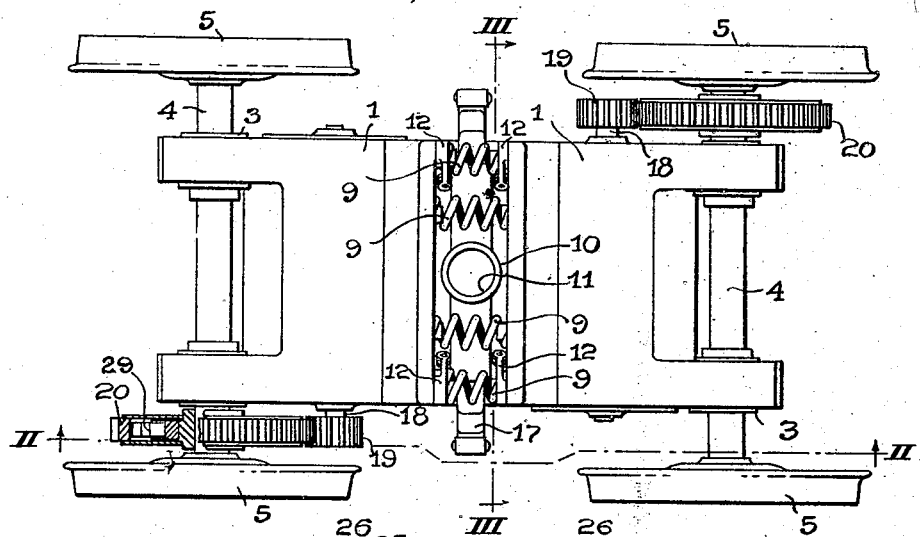
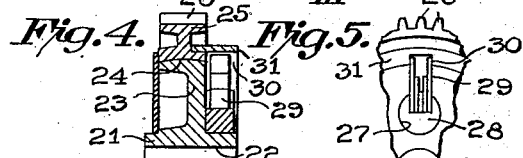
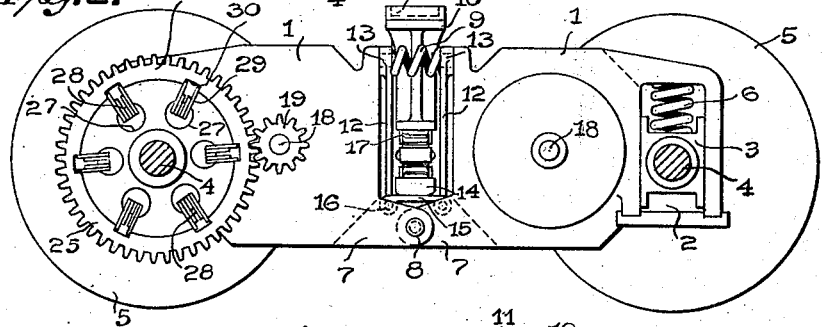
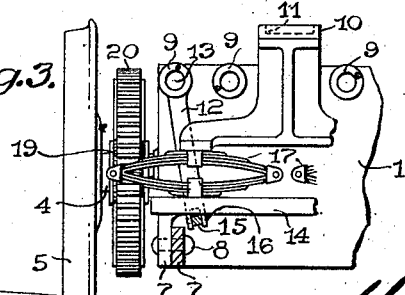
WITNESSES:  
R. S. Harrison  
W. B. Jaspert
INVENTOR  
Claude Bethel  
BY  
Wesley G. Carr  
ATTORNEY Patented May 3, 1927.

1,626,662

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

TRUCK-MOTOR-FRAME SUSPENSION.

Application filed September 8, 1923. Serial No. 661,555.

My invention relates to railway vehicles, more especially to the driving trucks of electric railway vehicles in which the motors, wheels, drive gears and other accessory parts are assembled in a novel structure.

It is among the objects of my invention to provide a truck structure for electric railway vehicles in which the driving motors are mounted in a novel manner that is productive of certain desirable operating characteristics.

It is a further object of my invention to provide a novel construction of truck in which the motor housings are journalled directly on the wheel axles and constitute the supporting frame member of the vehicle.

It is a further object of my invention to provide a truck structure which is yieldingly supported on the drive wheels and which is geared to the axles of the wheels in such manner as to provide certain relative movements of the several co-operating members.

It is still another object of my invention to provide a truck structure comprising a pair of motors pivotally connected together and pivotally mounted on axles and having means to yieldingly restrain the relative pivotal movement of the motors and their respective supporting axles.

Railway vehicle trucks of prior types embody the usual frame structure that is journalled to a plurality of wheel axles by journal boxes; and the drive motors are supported on the truck and axles in various ways, as by securing the motor to the truck frames and transoms, or securing the one side of the motor frame in such manner, and journalling another portion of the motor frame on the wheel axles. In this latter type of mounting, the motor housing is usually spring borne to avoid a rigid connection to the truck frame structure.

In many of these types of trucks, the wheels and frame constitute a unit separate from the motors and the latter are associated therewith in such manner as to provide rigid gear-center distances to insure a working alinement of the co-operating gear teeth. On the other hand, it is desirable to obtain resilient connections of the truck frame to the drive axles and also of the motors to the frames and axles, which necessitate the use of flexible elements in the gear-wheels and a flexible support for the entire truck. Under these conditions, it is extremely difficult to maintain proper gear centers, in conjunction with yieldingly flexible mountings of the several members constituting the truck.

My present invention relates to a truck design that is extremely flexible and resilient and provides rugged mechanical construction which could not be produced in prior devices. My construction further assures maintenance of gear centers yet permits of relative movement of the motor shafts and wheel axles of the motors and also with respect to each other. Such movement is largely dependent upon a flexible gear-wheel structure having a central hub or supporting portion that is universally movable relative to the gear rim, as is disclosed in my copending application, Serial No. 661,554 filed Sept. 8, 1923.

The functional characteristics of the truck are also produced by the omission of the usual truck frame, the method of mounting and joining the motors and other structural embodiments which will be more fully hereinafter set forth.

In the accompanying drawing constituting a part hereof and in which like reference characters designate like parts, Fig. 1 is a plan view of a railway vehicle truck embodying the principles of my invention, Fig. 2 is a side elevational view thereof taken along the line II—II of Fig. 1, Fig. 3 is a fragmentary end elevational view taken along the line III—III of Fig. 1, Fig. 4 is a fragmentary cross-sectional view of the gear-wheel mounted on the drive axle and Fig. 5 is a corresponding elevational view thereof.

My truck structure comprises a pair of motors 1 severally having pedestal jaws 2 adapted to receive vertically movable journals 3 for rotatably mounting wheel axles 4 carrying the wheels 5. Each motor 1 is resiliently supported on the corresponding journals 3 by intermediate coil springs 6. The motors 1 are pivoted together at their lower adjacent corners by means of extending brackets 7, constituting integral parts of the motor housing, and a pivot pin 8. The upper portions of the motor housings are separated by compression springs 9, which permit of yieldingly restrained pivotal movement of the motors 1 about the pivot pin 8.

A center-pin or swing bolster 10, having a central recessed portion 11 that is adapted to receive a center pin extending from the vehicle body, is suspended from the motors by a plurality of swing links 12, which are pivoted on a pair of inverted trunnions 13 to permit transverse swinging movement of a bolster 14. The bolster 14 is supported by a plurality of straps 15 resting on pins 16 which are secured in the lower extremity of the links 12. The swing bolster 10 is supported by a plurality of elliptical springs 17 that are mounted on the bolster plate 14, this construction being utilized to maintain the swing bolster 10 in a normal vertical position irrespective of the pivotal movement of the motors 1.

Each of the motors 1 has its armature shaft 18 connected to the corresponding axle 4 by a pinion 19 that engages a flexible gear-wheel 20. The gear-wheel 20 is constructed to permit misalinement of the axle and shaft members without affecting the gear tooth engagement of the corresponding pinion and gear wheel 19 and 20, respectively.

Referring to Figs. 2, 4 and 5, the gear-wheel 20 comprises a hub portion 21 having a central opening 22 by which it is secured to the axle 4, and flanged web or body portion 23 having a spherically curved outer periphery 24 that is adapted to engage a correspondingly shaped seating portion of the rim 25, which is provided with gear teeth 26. The hub portion 21 is provided with annular openings 27 that are adapted to receive spring nests 28 having leaf spring members 29 extending into slotted openings 30 of a ring 31, which is shrunk or otherwise secured to the gear rim 25, as shown in Fig. 4. The spherically curved seating portion of the hub and rim permit universal movement of the hub relative to the rim, while the flexible spring nests 28 provide for annular deflection of the rim and hub.

It will be noted from the above description of my invention that there is no dead weight upon the axles, which feature, coupled with the longitudinal resilient and pivotal connections of the motors, provides greater flexibility than is found in prior structures. It will also be noted that the truck, by virtue thereof, acts as a cushioning medium with respect to the vehicle body, which is supported on the center pin bolster 10, thus absorbing and dividing the shock and impact incident to railway service by means of the flexible elements interposed at the joints. The inherent operation of the horizontal springs 9 separating the motors 1 is such as to further impart a resilient support to the vehicle, as the weight on the bolster 10 has a tendency to pivot the motors inwardly against the tension of the springs 9. It is evident that my invention provides a truck structure having many desirable characteristics that are effective in reducing breakage and maintenance cost, and the functional characteristics of the invention further provide efficient operation and easier riding of the vehicle on the rail.

Although I have described a specific embodiment of my invention it will be obvious to those skilled in the art that various modifications may be made in the details of construction of the several co-operating parts without departing from the spirit of my invention.

I claim as my invention:—

1. A railway vehicle truck comprising a plurality of motors journalled on supporting wheel axles, means for pivotally connecting said motors to the vehicle frame, and means providing pivotal movement of the motors relative to their respective supporting axle and each other.

2. A railway vehicle truck comprising a plurality of motors journalled on supporting wheel axles, a center-pin bolster supported on said motors, a pivotal connection between the motors, and yieldingly restraining means for limiting the pivotal movement thereof.

3. A railway vehicle truck comprising a plurality of motors pivotally connected and mounted on a plurality of wheel axles, a swing bolster supported on the motor housings, and a plurality of flexible elements interposed between said motors to yieldingly restrain movement thereof about their pivotal joint.

4. A railway vehicle truck comprising a plurality of motors pivotally connected and yieldingly mounted on a plurality of wheel axles, a plurality of swing links, a swing bolster supported thereby on the motor housings, and a plurality of flexible elements interposed between said motors to yieldingly restrain movement thereof about their pivotal joint.

5. A railway vehicle truck comprising a plurality of motors joined to constitute a self-sustaining body portion, said motors being journalled on wheel axles of the vehicle.

6. A railway vehicle comprising a plurality of motors yieldingly joined to constitute a self-sustaining body portion pivotally movable substantially at its center, said motors being journalled on wheel axles of the vehicle.

7. A railway vehicle comprising a plurality of motors joined to constitute a self-sustaining truck frame, and means for mounting the same on a plurality of wheel axles of the vehicle.

8. A railway vehicle truck comprising a pair of motors hinged together and supported at their free ends on wheel axles of the vehicle, and means for restraining movements of said motors at the hinged joint.

9. A railway vehicle truck comprising a pair of motors hinged together and supported at their free ends on wheel axles of the vehicle, and means for yieldingly restraining movement of said motors at the hinged joint.

10. A railway vehicle truck comprising a pair of motors hinged together and supported at their free ends on wheel axles of the vehicle, gear wheels mounted on said axles, pinions on the motor shafts in engagement with said gear wheels and means for permitting relative movement of said motors, axles, and gear-wheels.

11. A railway vehicle truck comprising a pair of motors hinged together and supported at their free ends on wheel axles of the vehicle, and a plurality of flexible elements interposed between said motors in such a manner as to subject said elements to a longitudinal pressure component produced by weight on said motors.

12. A railway vehicle truck comprising a pair of motors hinged together and supported at their free ends on wheel axles of the vehicles, a plurality of flexible elements interposed between said motors in such a manner as to subject said elements to a longitudinal pressure component produced by weight on said motors, and a gear connection between the motor shafts and axles to permit of relative movement thereof.

13. A railway vehicle truck body comprising a pair of axle-mounted motors joined to constitute a unitary self-sustaining structure.

14. A railway vehicle truck body comprising a pair of axle-mounted motors pivotally joined to constitute a unitary structure.

15. A railway vehicle truck comprising a pair of motors geared to and mounted on a pair of wheel axles of the vehicle, and resilient vertical and longitudinal restraining means for said motors.

16. A railway vehicle comprising a plurality of motors joined to constitute a self-sustaining truck frame, means for mounting said motors on a plurality of wheel axles of the vehicle and gear trains comprising spherically seated flexible gear wheels for connecting said motors and wheel axles.

17. A railway vehicle truck comprising a plurality of motors joined to constitute a self-sustaining body portion, means for resiliently supporting said motors on wheel axles of the vehicle and gear trains for operatively connecting the motors to the wheel axles, said gear trains embodying resilient spherically seated gear wheels.

18. A railway vehicle truck comprising a plurality of motors joined to constitute a self-sustaining body portion, said motors being resiliently supported on the wheel axles of the vehicle.

19. A railway vehicle truck body comprising a pair of axle mounted motors joined to constitute a unitary self-sustaining structure and resilient means for mounting said motors on the truck axles.

20. A railway vehicle truck body comprising a pair of axle mounted motors joined to constitute a unitary self-sustaining structure and spherically seated flexible gear-wheels operatively connecting said motors and the truck axles.

21. A railway vehicle truck comprising a pair of axle mounted motors joined to constitute a unitary self-sustaining body structure, resilient means for mounting said motors on the truck axles and a gear train comprising spherically seated flexible gear wheels for operatively connecting said motors to said truck axles.

In testimony whereof, I have hereunto subscribed my name this 23rd day of August, 1923.

CLAUDE BETHEL.